United States Patent
Tardy-Tuch et al.

(10) Patent No.: US 7,530,586 B2
(45) Date of Patent: May 12, 2009

(54) HOLDER FOR STABILIZER OF A WHEEL SUSPENSION

(75) Inventors: Georg Tardy-Tuch, Malmsheim (DE); Achim Schulz, Niefern-Oeschelbronn (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 475 days.

(21) Appl. No.: 11/335,613

(22) Filed: Jan. 20, 2006

(65) Prior Publication Data

US 2006/0163832 A1 Jul. 27, 2006

(30) Foreign Application Priority Data

Jan. 21, 2005 (DE) .................. 10 2005 002 889

(51) Int. Cl.
*B60G 11/20* (2006.01)
(52) U.S. Cl. .................. 280/124.137; 280/124.134; 280/124.145; 280/124.149; 280/124.154
(58) Field of Classification Search .......... 280/124.134, 280/124.137, 124.145, 124.149, 124.154
See application file for complete search history.

(56) References Cited

U.S. PATENT DOCUMENTS 2,794,652 A * 6/1957 Kolbe .................. 208/124.103
4,327,927 A * 5/1982 Tanaka et al. .......... 280/124.137
4,779,893 A * 10/1988 Juechter ............... 280/124.145
4,784,406 A 11/1988 Stinson
5,249,817 A * 10/1993 Bruhl .................. 280/124.137
5,797,618 A * 8/1998 Brokholc ............. 280/124.106
6,305,701 B1 10/2001 Bobinger et al.
6,719,314 B1 4/2004 Schote
6,793,228 B2 * 9/2004 Zadok ................. 280/124.134

FOREIGN PATENT DOCUMENTS

| DE | 80 12 412 U1 | 10/1980 |
| DE | 41 02 967 A1 | 8/1991 |
| DE | 42 42 815 A1 | 6/1993 |
| DE | 44 14 339 C2 | 10/1995 |
| DE | 200 23 579 U1 | 1/2005 |
| EP | 0 044 579 A1 | 1/1982 |
| EP | 1 457 360 A1 | 9/2004 |
| GB | 2 197 268 A | 5/1988 |
| JP | 2003-118345 A | 4/2003 |

OTHER PUBLICATIONS

European Search Report dated Sep. 26, 2006 with English translation of relevant portion (Three (3) pages).

* cited by examiner

*Primary Examiner*—John Q. Nguyen
*Assistant Examiner*—Barry Gooden, Jr.

(57) ABSTRACT

A holding device for a wheel suspension stabilizer bar has a coupling element connected to a suspension fork of a suspension strut and a bracket of the suspension strut. The attachment is effected over a relatively large base to achieve a stable connection or link of the stabilizer bar to the suspension strut or suspension fork.

11 Claims, 1 Drawing Sheet

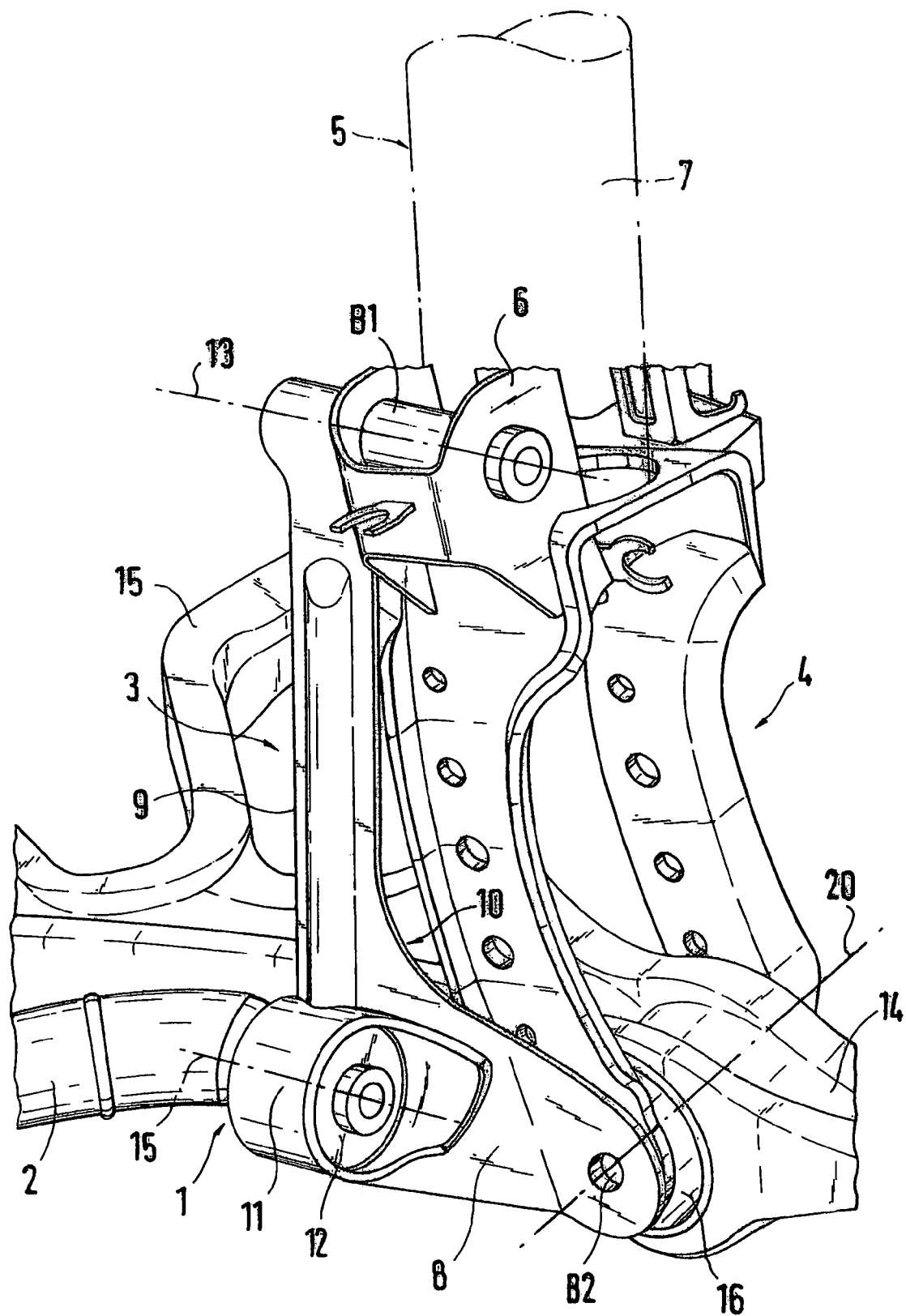

HOLDER FOR STABILIZER OF A WHEEL SUSPENSION

BACKGROUND AND SUMMARY OF THE INVENTION

The present invention relates to a holding device for a motor vehicle wheel suspension stabilizer bar having a bearing arrangement on a suspension strut.

U.S. Pat. No. 6,305,701 B1 discloses a stabilizer bar with a holding device on a suspension cylinder. This holding device consists of a bracket that holds a free end of the stabilizer bar in a bearing.

An object of the present invention is to provide a holding device for a stabilizer bar which reliably transmits the loads that occur in operation between the stabilizer bar and the suspension strut.

According to the invention, this object has been attained by providing that a coupling element is connected to the suspension strut by means of at least two mutually spaced apart attachments, and a bearing seat for a stabilizer bearing is provided on or in the coupling element and a free end of the stabilizer bar is held in this stabilizer bearing.

Among the primary advantages achieved by the present invention are that the stabilizer bar is fixed to the suspension strut in a stable but elastic manner.

To enable a stable and secure attachment on a suspension fork and a suspension cylinder, the coupling element is L-shaped and extends from the one attachment on a boss of the suspension fork on the wheel control arm to another attachment on a bracket at the free lower end of the suspension cylinder. In particular, the coupling element of the present invention comprises a leg which extends from the attachment up to the free end of the stabilizer bar and a vertical brace adjoining thereto, which extend sup to the additional attachment on the bracket on the suspension cylinder. The leg of the coupling element is approximately in the same plane as the wheel control arm.

With this fastening by way of the attachments disposed at a vertical distance relative to one another, the coupling element is held on the suspension fork or the suspension cylinder over a large base so that maximum loads can be optimally absorbed.

The bearing seat is disposed in the corner-side junction region between the leg and the brace and is an integral molding in the coupling element or a welded-in tubular sleeve. If the coupling element is a casting, the bearing seat may be molded into the coupling element. If the coupling element is a sheet metal construction, the tubular sleeve may, for example, be welded thereto. A casting is also contemplated, however. The relative movements between the suspension strut and the stabilizer bar are compensated by the elasticity inherent in the coupling element and the bearing.

BRIEF DESCRIPTION OF THE DRAWING

The sole figure is a perspective view of a lower portion of a suspension strut oriented toward a wheel control arm, with a suspension fork and a mounted coupling element with a stabilizer bar supported therein.

DETAILED DESCRIPTION OF THE DRAWING

A coupling element designated generally by numeral 3 is firmly connected to a fork 4 or a fork portion of a suspension strut 5 and is used to support each free end 1 of a stabilizer bar 2, which is disposed cross-wise in a motor vehicle.

The coupling element 3, by way of at least two vertically spaced-apart attachments B1, B2, is connected to the suspension fork 4 and a bracket 6 which is mounted to the suspension strut cylinder 7 and/or the suspension fork 4.

The coupling element 3 is generally L-shaped and has an approximately horizontal leg 8 and an adjoining approximately vertical brace 9. In the corner region, i.e., in the junction area 10 between the leg 8 and the brace 9, a bearing seat 11 for a stabilizer bearing 12 is disposed, in which the free end 1 of the stabilizer bar 2 is respectively supported. If the coupling element 3 is a casting, for example, the bearing seat 11 may be molded into the coupling element 4. If a sheet metal construction is used, for example, a tubular sleeve is welded thereto.

The first attachment B1 has an axis 13 which extends approximately parallel to the bearing axis 15 of the stabilizer bearing 12. The additional attachment B2 has an axis 20 which is rotated by 90° relative to the axis 13 of the attachment B1.

With its two fork ends, the suspension fork 4 overlaps a wheel suspension wheel control arm 14. The bearing arrangement 16 of the suspension fork 4 on this arm 14 is simultaneously used to fasten the coupling element 3 to the suspension fork 4.

To compensate the relative movements between the suspension strut 5 and the stabilizer bar 2, the coupling element 3 has a defined wall thickness imparting a corresponding elasticity thereto, and this characteristic is further supplemented by the elastic stabilizer bearing 12. If the coupling element 3 is a casting, the elasticity is provided only by the stabilizer bearing 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for a stabilizer bar of a motor vehicle wheel suspension, comprising a bearing arrangement on a suspension strut, wherein a coupling element is connected to the suspension strut by mutually spaced apart attachments, and a bearing seat for a stabilizer bearing is provided on or in the coupling element with a free end of the stabilizer bar being operatively held in the stabilizer bearing, wherein the coupling element has a generally L-shaped configuration and extends from a first one of the attachments on a boss of a wheel control arm suspension fork up to a second one of the attachments on a bracket on a lower free end of a suspension cylinder.

2. The holding device as claimed in claim 1, wherein the coupling element is a sheet metal construction having a defined wall thickness and an inherent elasticity superimposed by an elasticity of the stabilizer bearing.

3. The holding device as claimed in claim 1, wherein the generally L-shaped configuration of the coupling element comprises a leg which extends from the first one of the attachments up to the free end of the stabilizer bar and an adjoining vertical brace which extends up to the second one of the attachments on the bracket on the suspension cylinder.

4. The holding device as claimed in claim 3, wherein the leg is disposed approximately in a same plane as a wheel suspension wheel control arm.

5. The holding device as claimed in claim 3, wherein the bearing seat is disposed in a corner junction region between the leg and the brace and is one of an integral molding in the coupling element or a welded-in tubular sleeve on the coupling element.

6. A holding device for a stabilizer bar of a motor vehicle wheel suspension, comprising a bearing arrangement on a suspension strut, wherein a coupling element is connected to the suspension strut by mutually spaced apart attachments, and a bearing seat for a stabilizer bearing is provided on or in the coupling element with a free end of the stabilizer bar being operatively held in the stabilizer bearing, wherein an axis of a first one of the attachments extends approximately parallel to a bearing axis of the stabilizer bearing, and an axis of a second one of the attachments is disposed on a boss of a wheel control arm suspension fork and is rotated by 90° relative to the axis of the first one of the attachments.

7. The holding device as claimed in claim 6, wherein the coupling element is a sheet metal construction having a defined wall thickness and an inherent elasticity superimposed by an elasticity of the stabilizer bearing.

8. The holding device as claimed in claim 6, wherein the coupling element has a generally L-shaped configuration and extends from the second one of the attachments on the boss of the wheel control arm suspension fork up to the first one of the attachments on a bracket on a lower free end of a suspension cylinder.

9. The holding device as claimed in claim 8, wherein the generally L-shaped configuration of the coupling element comprises a leg which extends from the second one of the attachments up to the free end of the stabilizer bar and an adjoining vertical brace which extends up to the first one of the attachments on the bracket on the suspension cylinder.

10. The holding device as claimed in claim 9, wherein the leg is disposed approximately in a same plane as a wheel suspension wheel control arm.

11. The holding device as claimed in claim 9, wherein the bearing seat is disposed in a corner junction region between the leg and the brace and is one of an integral molding in the coupling element or a welded-in tubular sleeve on the coupling element.

* * * * *